(12) United States Patent
Wang

(10) Patent No.: US 11,850,472 B2
(45) Date of Patent: Dec. 26, 2023

(54) DEVICE AND METHOD FOR VIRTUAL WALKING

(71) Applicant: HANGZHOU VIRTUAL AND REALITY TECHNOLOGY CO., LTD., Hangzhou (CN)

(72) Inventor: Bo Wang, Hangzhou (CN)

(73) Assignee: HANGZHOU VIRTUAL AND REALITY TECHNOLOGY CO., LTD., Hangzhou (CN)

( * ) Notice: Subject to any disclaimer, the term of this patent is extended or adjusted under 35 U.S.C. 154(b) by 125 days.

(21) Appl. No.: 17/721,302

(22) Filed: Apr. 14, 2022

(65) Prior Publication Data

US 2023/0293945 A1 Sep. 21, 2023

(30) Foreign Application Priority Data

Mar. 15, 2022 (CN) .......................... 202210255015.7

(51) Int. Cl.
*A63B 24/00* (2006.01)
*A63B 22/02* (2006.01)
(Continued)

(52) U.S. Cl.
CPC ...... *A63B 24/0087* (2013.01); *A63B 22/0285* (2013.01); *A63B 22/20* (2013.01);
(Continued)

(58) Field of Classification Search
CPC . A63B 24/0087; A63B 22/0285; A63B 22/20; A63B 24/0062; A63B 71/0622; A63B 2024/0096; A63B 2071/0638; A63B 2220/34; A63B 2220/44; A63B 2220/805; A63B 2220/836; A63B 2022/002; A63B 2220/801; A63B 2022/0028; A63B 2220/13; A63B 2220/16; A63B 2220/52; A63B 22/02; A63B 2022/0271; A63B 2024/0093; A63B 2220/20; A63B 2220/58; G05D 1/0223; G05D 1/0221; G05D 1/0276; G05D 2201/02; G06F 3/011
See application file for complete search history.

(56) References Cited

U.S. PATENT DOCUMENTS 7,470,218 B2 * 12/2008 Williams ................ G06F 3/011
                                                                   482/148
9,329,681 B2 *  5/2016 Goetgeluk ......... A63B 69/0064
(Continued)

*Primary Examiner* — Andrew S Lo

(57) ABSTRACT

A device for visual walking includes an omnidirectional exercise machine and foot wearable devices. A method for visual walking is applied to the device for visual walking. When a user wears the omnidirectional exercise machine and uses the loading frame to adjust a height of the omnidirectional exercise machine, and wears the foot wearable devices to stand and run on a running plate, human body posture data is obtained by tracking a human body torso. Then displacement data of left and right feet is obtained by tracking the feet. A virtual position and a movement speed of the feet are respectively obtained according to the displacement data, the leg posture is inferred by the IK algorithm according to the virtual position and the walking action of the virtual character is controlled according to the human body posture data, the movement speed of the feet, and the leg posture.

9 Claims, 6 Drawing Sheets

(51) Int. Cl.
  *A63B 22/20*   (2006.01)
  *A63B 71/06*   (2006.01)
  *G06F 3/01*    (2006.01)

(52) U.S. Cl.
  CPC ...... *A63B 24/0062* (2013.01); *A63B 71/0622* (2013.01); *A63B 2024/0096* (2013.01); *A63B 2071/0638* (2013.01); *A63B 2220/34* (2013.01); *A63B 2220/44* (2013.01); *A63B 2220/805* (2013.01); *A63B 2220/836* (2013.01); *G06F 3/01* (2013.01)

(56) References Cited

U.S. PATENT DOCUMENTS

| | | | |
|---|---|---|---|
| 10,101,805 B2 * | 10/2018 | Choi | A63B 69/0035 |
| 10,486,075 B2 * | 11/2019 | Wang | A63G 31/16 |
| D870,730 S * | 12/2019 | Wang | D21/828 |
| 11,216,081 B2 * | 1/2022 | Bieglmayer | G06F 3/0346 |
| D955,486 S * | 6/2022 | Wang | D21/325 |
| 2009/0111670 A1 * | 4/2009 | Williams | A63B 23/0464 |
| | | | 482/146 |
| 2021/0346755 A1 * | 11/2021 | Epstein | F16C 23/06 |
| 2021/0366193 A1 * | 11/2021 | Goetgeluk | G06F 3/011 |

* cited by examiner

Obtaining human body posture data by tracking a torso of a human body through an inertial sensor Obtaining displacement data of feet by tracking feet of the human body through laser sensors respectively obtaining a virtual position of the feet and a movement speed of the feet according to the displacement data of the feet Inferring a leg posture by the IK algorithm according to the virtual position of the feet Controlling walking action of a virtual character according to the human body posture data, the movement speed of the feet, and the leg posture.

FIG. 5

DEVICE AND METHOD FOR VIRTUAL WALKING

TECHNICAL FIELD

The present disclosure relates to a technical field of visual reality technology, and in particular to a device for visual walking and a method for visual walking.

BACKGROUND

In a virtual reality environment, users need to move and roam in the virtual world, Movement control methods of a visual character are listed as follows. A first one is to control the virtual character by directional control buttons. A user controls a movement direction and speed of the virtual character by controlling buttons, joysticks, etc. on a device such as a control handle and a keyboard. This method is cheap and reliable. However, after wearing a head-mounted display device where the user has a highly immersive visual experience when using the buttons to control the movement direction and the speed of the virtual character, the vestibular organs of the human body that sense a movement state of the human body do not perceive the corresponding movement, and the difference between perception and physical perception brings the user a strong sense of dizziness.

A second method is to control the virtual character by an omnidirectional movement platform. The user stands on the omnidirectional movement platform, walks, and runs in any direction in place. This method greatly reduces the difference between visual perception and physical perception in the virtual reality environment, and eliminates the user's dizziness. However, a full set of the omnidirectional movement platform is bulky and expensive, and is not suitable for home consumption entertainment.

A third method is to control the virtual character by capturing human positions in a fixed environment (as disclosed in the CN patent application No. 201110430789.0, titled "Skeleton Control of Three-dimensional Virtual World"). The user is in the fixed environment and position tracking devices are mounted around the fixed environment to capture a position of the user. The movement of the user in a certain space is mapped to the virtual world, thereby realizing a certain range of movement control. This method has relatively high requirements on the environment and is unable to realize movement in a large range in the virtual world.

CN patent number CN109388142A discloses a method and system for controlling virtual walking based on an inertial sensor. This method mainly controls the virtual character by obtaining torso data of the human body. However, real leg posture and movement is not effectively applied to the virtual world and the user experience is greatly reduced.

SUMMARY

A purpose of the present disclosure is to provide a device for virtual walking and a method for virtual walking. The present disclosure has good adaptability, is stable and comfortable when walking. In the present disclosure, an inertial sensor and laser sensors on feet are applied to realize the real walking experience in virtual world and the device for visual walking of the present disclose has good fit and immersion.

The present disclosure provides a device for virtual walking.

The device for virtual walking comprises an omnidirectional exercise machine and foot wearable devices. The omnidirectional exercise machine comprises a base. A support piece is arranged on the base through a bearing. A running plate is arranged on the support piece. One side of the bearing is connected with two back support rods through rotating beams. A loading connector is arranged on upper ends of the two back support rods. The loading connector is sequentially connected with a waist omnidirectional motion controller and a binding belt. The base, the support piece, and the running plate are coaxially arranged. An inertial sensor is arranged inside the waist omnidirectional motion controller. The loading connector comprises a loading frame; rows of connecting holes are on one side of the loading frame. A mounting frame is arranged between the two back support rods. The mounting frame is fixedly connected with at least one row of connecting holes of the rows of connecting holes through connecting pieces. The foot wearable devices are configured to move on the running plate. Each of the foot wearable devices comprises a wrapping body. A pair of rollers are arranged on a rear end of a bottom portion of each wrapping body. A laser sensor is arranged on a front end of the bottom portion of each wrapping body.

In the device for virtual walking, a middle portion of each roller is wrapped with rubber.

In the device for virtual walking, a mounting groove is provided on the bottom portion of each wrapping body. Two mounting bars are separately arranged on two sides of each mounting groove. An outer side of each of the mounting bar is connected with a corresponding roller.

In the device for virtual walking, a flipping locking cover is arranged between each two mounting bars. Each flipping locking cover is configured to lock a corresponding pair of rollers.

The present disclosure further provides a method for virtual walking of the device for visual walking. The method for visual walking comprise steps:

obtaining human body posture data; wherein the human body posture data is obtained by tracking a torso of a human body through the inertial sensor;

obtaining displacement data of a left foot and a right foot of the human body;

wherein the displacement data is obtained by tracking feet of the human body through the laser sensors;

respectively obtaining a virtual position of the feet and a movement speed of the feet according to the displacement data of the left foot and the right foot;

inferring a leg posture by the inverse kinematic (IK) algorithm according to the virtual position of the feet; and controlling walking action of a virtual character according to the human body posture data, the movement speed of the feet, and the leg posture.

In the method for virtual walking, the step of obtaining the human body posture data comprises:

obtaining a direction perpendicular to ground by a gyroscope in the inertial sensor;

measuring an angular acceleration value by the gyroscope; obtaining an angular velocity value by integrating the angular acceleration value in time;

measuring a earth's magnetic field by a magnetometer to obtain a due north direction; obtaining a direction of gravity by an accelerometer;

comparing the angular velocity value with the direction perpendicular to the ground obtained by the gyroscope; and measuring an orientation of the torso of the human body and an attitude angle of the torso of the human body by performing fusion correction on the due north direction and the direction of gravity;

iteratively calculating an error function of the attitude angle by a gradient descent method; continuously correcting an error of the attitude angle until an value of the error of the attitude angle in a current iteration process is within a predetermined range; and dividing a whole integration process into multiple segments by reference points appearing periodically when integrating the angular acceleration value in time;

suppressing an error of the angular acceleration value in each segment by a median filter method.

In the method for virtual walking, the virtual position of the feet and the movement speed of the feet are obtained by using the laser sensors to obtain movement position coordinates of the feet and a ground-off state of the feet. The movement speed of the feet and a direction of the feet are calculated based on the movement position coordinates of the feet, the ground-off state of the feet, and a bone reconstruction algorithm.

In the method for virtual walking, the leg posture is obtained by taking the virtual position of the feet as a last bone point, calculating a length from the last bone point to an upper bone point and a direction from the last bone point to the upper bone point by the IK algorithm, determining a position of an upper joint bone, and calculating a length between each bone point and a rotating angle between each bone point in turn to obtain the leg posture.

In the method for virtual walking, the steps of controlling the walking action of the virtual character comprises controlling a walking direction of the virtual character according to the human body posture data, controlling a walking speed of the virtual character according to the movement speed of the feet, and controlling a leg movement of the virtual character according to the leg posture.

Compared with the prior art, the present disclosure optimizes a structure of the loading connector of the omnidirectional excise machine. By arranging multiple rows of connecting holes on the one side of the loading frame, mounting the mounting frame between the back support rods, and fixing the mounting frame with the connecting holes, a user is able to install the omnidirectional excise machine according to a height of the user.

Meanwhile, different from a sliding friction method of conventional foot wearable devices on the running plate, the foot wearable devices of the present disclosure adopts a mixed friction method combining rolling and sliding on the running plate. When the user walks on the running plate, the rollers make the user walk stably and flexibly. The sliding friction of the rollers on the running plate is used as an auxiliary to achieve effect that the foot wearable devices full contact the running plate, which provides a comfortable walking experience.

In addition, in the present disclosure, the middle portion of each roller is wrapped with high-strength rubber to achieve effect of buffering and noise reduction. In the present disclosure, each flipping locking cover is integrated in each mounting groove. The flipping locking covers are configured to lock the rollers. When in use, the flipping locking covers are opened. After use, the flipping locking covers are closed to lock the rollers, so as to achieve a purpose of locking the rollers, achieve safety of the device for visual walking, and improves the aesthetics.

In the method for visual walking of the present disclosure, the human body posture data is obtained by tracking the torso of the human body, the displacement data of the left foot and the right foot is obtained by tracking the feet of the human body through the laser sensors, the virtual position of the feet and the movement speed of the feet are respectively obtained according to the displacement data of the left foot and the right foot, the leg posture is inferred by the IK algorithm according to the virtual position of the feet, and the walking action of the virtual character is controlled according to the human body posture data, the movement speed of the feet, and the leg posture. The method for visual walking of the present disclosure overcomes a difference between visual perception and physical perception, and does not bring a strong sense of dizziness to the user. Moreover, in the present disclosure, the user is able to obtain the displacement data of the left foot and the right foot in real time through the laser sensors, and then combine it with virtual reality. Compared with the conventional virtual reality technology, the present disclosure brings a better feeling to the user, has a better sense of fit and immersion.

BRIEF DESCRIPTION OF DRAWINGS

FIG. 5 is a flow chart of a method for visual walking of the present disclosure.

Figure 1:
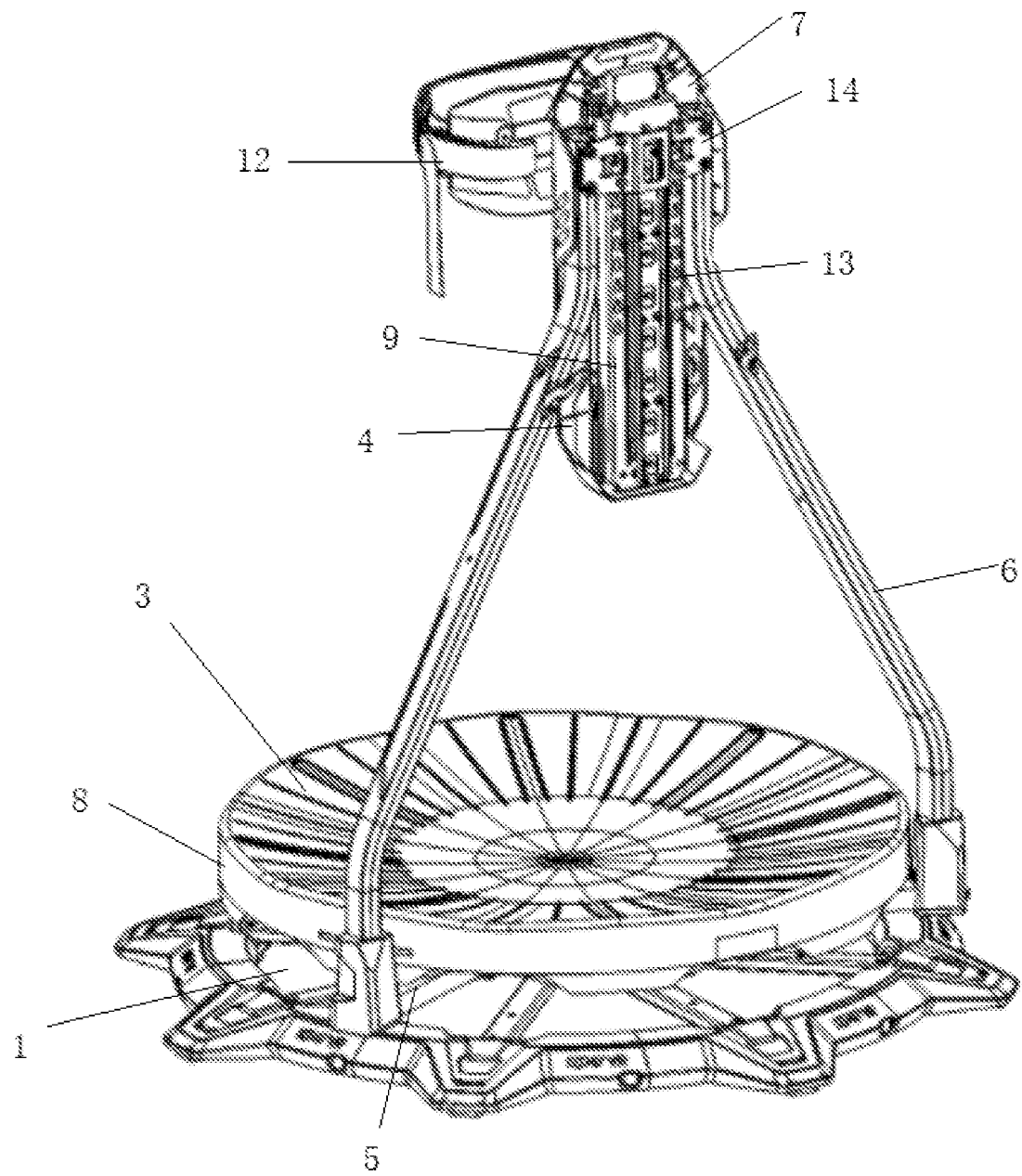
FIG. 1 is a structural schematic diagram of an omnidirectional exercise machine of the present disclosure.

In the drawings: 1—base; 2—bearing; 3—running plate; 4—loading connector; 5—rotating beam; 6—back support rod; 7—waist omnidirectional motion controller; 8—support piece; 9—loading frame; 12—binding belt; 13—connecting hole; 14—mounting frame; 15—wrapping body; 16—roller; 17—mounting slot; 18—mounting bar; 19—flipping locking cover.

DETAILED DESCRIPTION

The present disclosure will be further described below in conjunction with the accompanying drawings and embodiments. The drawings and embodiments should not be regarded as bases for limiting the present disclosure.

Embodiment 1

Figure 2:
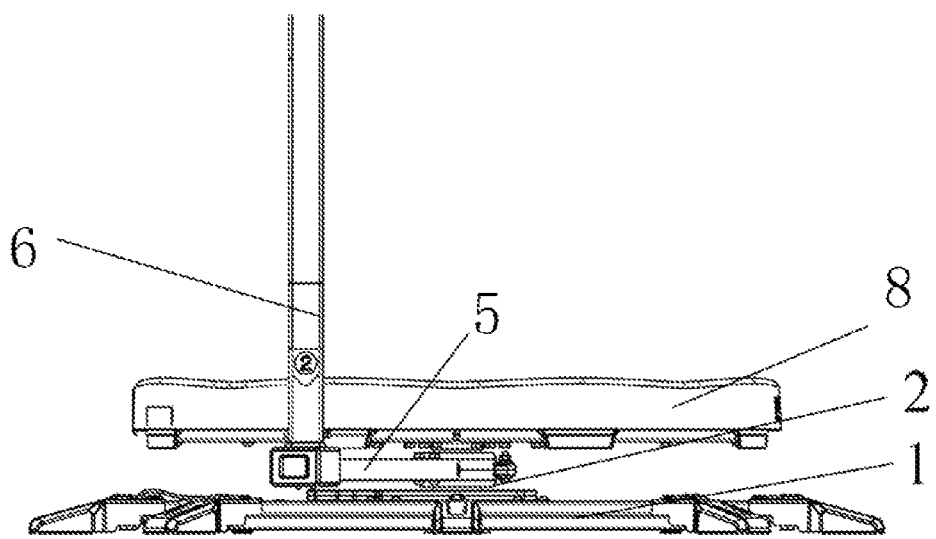
FIG. 2 is a structural schematic diagram of a base of the omnidirectional exercise machine of the present disclosure.

As shown in FIGS. 1-4, the present disclosure provides a device for virtual walking. The device for virtual walking comprises an omnidirectional exercise machine and foot wearable devices. As shown in FIG. 2, the omnidirectional exercise machine comprises a base 1. A support piece 8 is arranged on the base 1 through a bearing 2. A running plate 3 is arranged on the support piece 8. One side of the bearing 2 is connected with two back support rods 6 through rotating beams 5. A loading connector 4 is arranged on upper ends of the two back support rods 6. The loading connector 4 is connected with a waist omnidirectional motion controller 7. The base 1, the support piece 8, and the running plate 5 are coaxially arranged.

In the embodiment, the omnidirectional exercise machine maintains the base 1, the bearing 2, the support piece 8, the running plate 3 and the loading connector 4 used in the prior art. The base 1 is placed or fixed on the ground as a whole to support a weight of the omnidirectional exercise machine and prevent the omnidirectional exercise machine from overturning. When a user moves on the running plate 3, force acts on the support piece 8, so the bearing 2 and an overall bearing accessory assembly are driven to rotate. The support piece 8 is configured to fix the running plated 3 and is coaxially connected with the base 1, so that the force of the user acting on the running plate 3 is transmitted to the base 1 through the support piece 8, and is finally transmitted to the ground. The running plate 3 is a support carrier of the user and provides a range of activities for the user. The user stands on the running plate 3 to perform actions and operations. The loading connector 4 supports the back of the user so as to realize the action of the user. The waist omnidirectional motion controller 7 carefully support the waist of the user so as to realize the action of the user.

The above contents are all disclosed in the Chinese patent No. CN201920999658.6, titled "LIGHTWEIGHT VR OMNIDIRECTIONAL EXERCISE MACHINE", and those skilled in the art can set it according to their needs.

The loading connector 4 comprises a loading frame 9, and sliding rails are arranged on two sides of an inner wall of the loading frame 9. A sliding block is arranged between the sliding rails. One side of the sliding block towards the running plate is connected to the waist omnidirectional motion controller 7 and the binding belt 12. An inertial sensor is arranged inside the waist omnidirectional motion controller 7. The above contents are all disclosed in the Chinese patent No. CN202021023373.8, titled "VR OMNIDIRECTIONAL EXERCISE MACHINE SUITABLE FOR WAIST OMNIDIRECTIONAL MOTION", and those skilled in the art can set it according to their needs In the embodiment, an infrared matrix sensor and several Hall sensors arranged in the waist omnidirectional motion controller 7 in the prior art are replaced with the inertial sensor. The inertial sensor is a 9-axis sensor. The 9-axis sensor comprises an accelerometer with 14-bit resolution and a range of ±16 g, a uT magnetometer with 15-bit resolution and a detecting range of ±1300 uT/±2500 (Z-axis), and a gyroscope with 16-bit resolution and a detecting range of ±2000 degree/s. The 9-axis sensor provides excellent 9-axis motion tracking. The waist omnidirectional motion controller 7 integrates an ARM® Cortex™-M0+ microcontroller that comprises Motion Engine firmware, which provides sophisticated signal processing algorithms to process sensor data and provide accurate real-time 3D orientation, heading, calibrated acceleration, and calibrated angular velocity.

Figure 3:
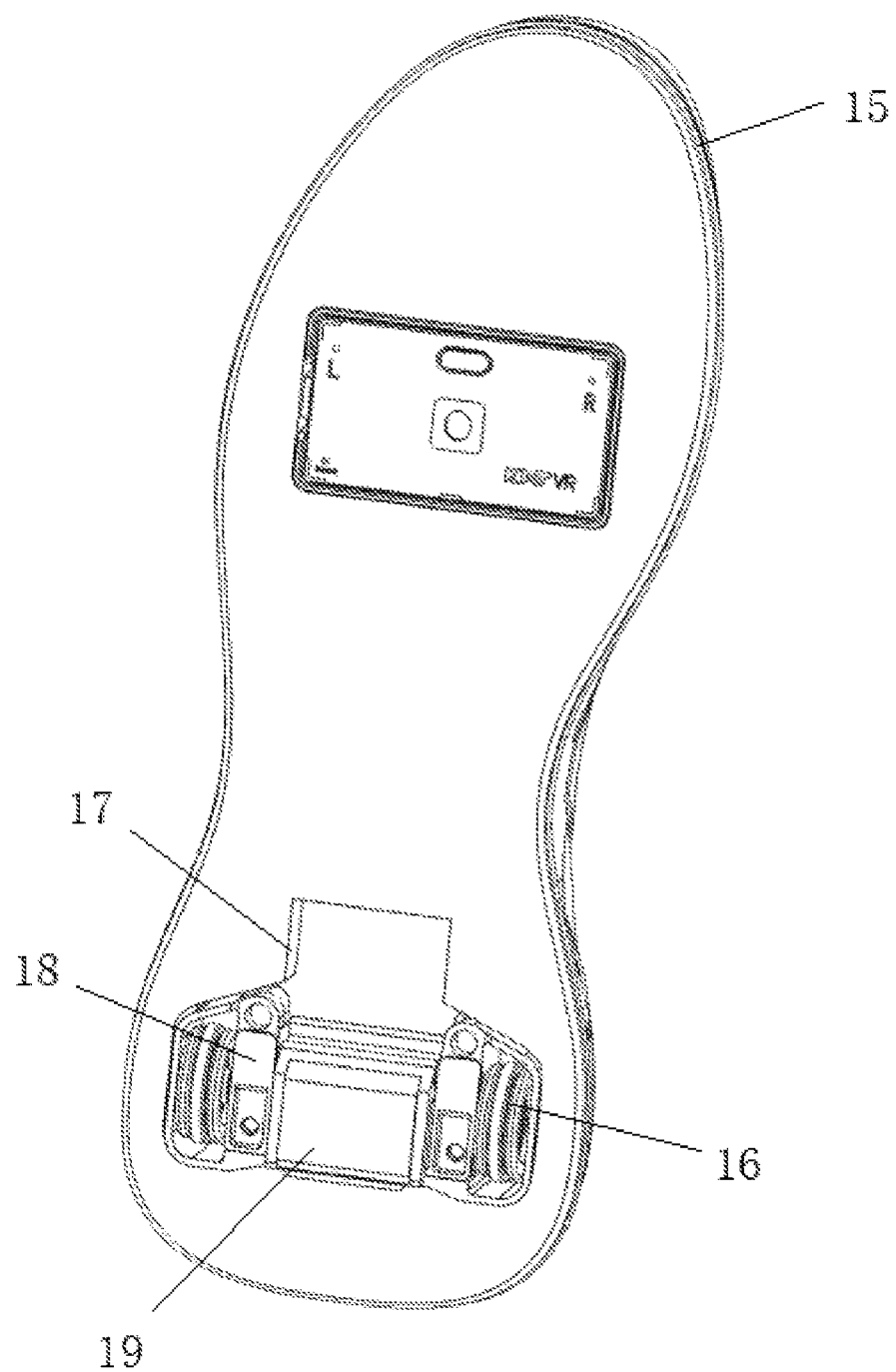
FIG. 3 is a structural schematic diagram of a foot wearable device of the present disclosure.

Rows of connecting holes 13 are on one side of the loading frame 9. A mounting frame 14 is arranged between the two back support rods 6. The mounting frame 14 is fixedly connected with at least one row of connecting holes 13 of the rows of connecting holes through connecting pieces. The rows of connecting hole 13 are arranged at a height of 140-200 cm in equal difference, so as to meet a height requirements of different users, As shown in FIG. 3, the foot wearable devices are configured to move on the running plate 3. Each of the foot wearable devices comprises a wrapping body 15. A pair of rollers 16 are arranged on a rear end of a bottom portion of each wrapping body 15. A laser sensor is arranged on a front end of the bottom portion of each wrapping body. A middle portion of each roller 16 is wrapped with rubber.

A mounting groove 17 is provided on the bottom portion of each wrapping body 15. Two mounting bars 18 are separately arranged on two sides of each mounting groove 17. An outer side of each of the mounting bar 18 is connected with a corresponding roller 16. A flipping locking cover 19 is arranged between each two mounting bars 18. Each flipping locking cover 19 is configured to lock a corresponding pair of rollers 16. In the present disclosure, a structure of the loading connector 4 of the omnidirectional excise machine is optimized, By arranging multiple rows of connecting holes 13 on the one side of the loading frame 9, mounting the mounting frame 14 between the back support rods 6, and fixing the mounting frame 14 with the connecting holes 13, the user is able to install the omnidirectional exercise machine according to a height of the user.

Figure 4:
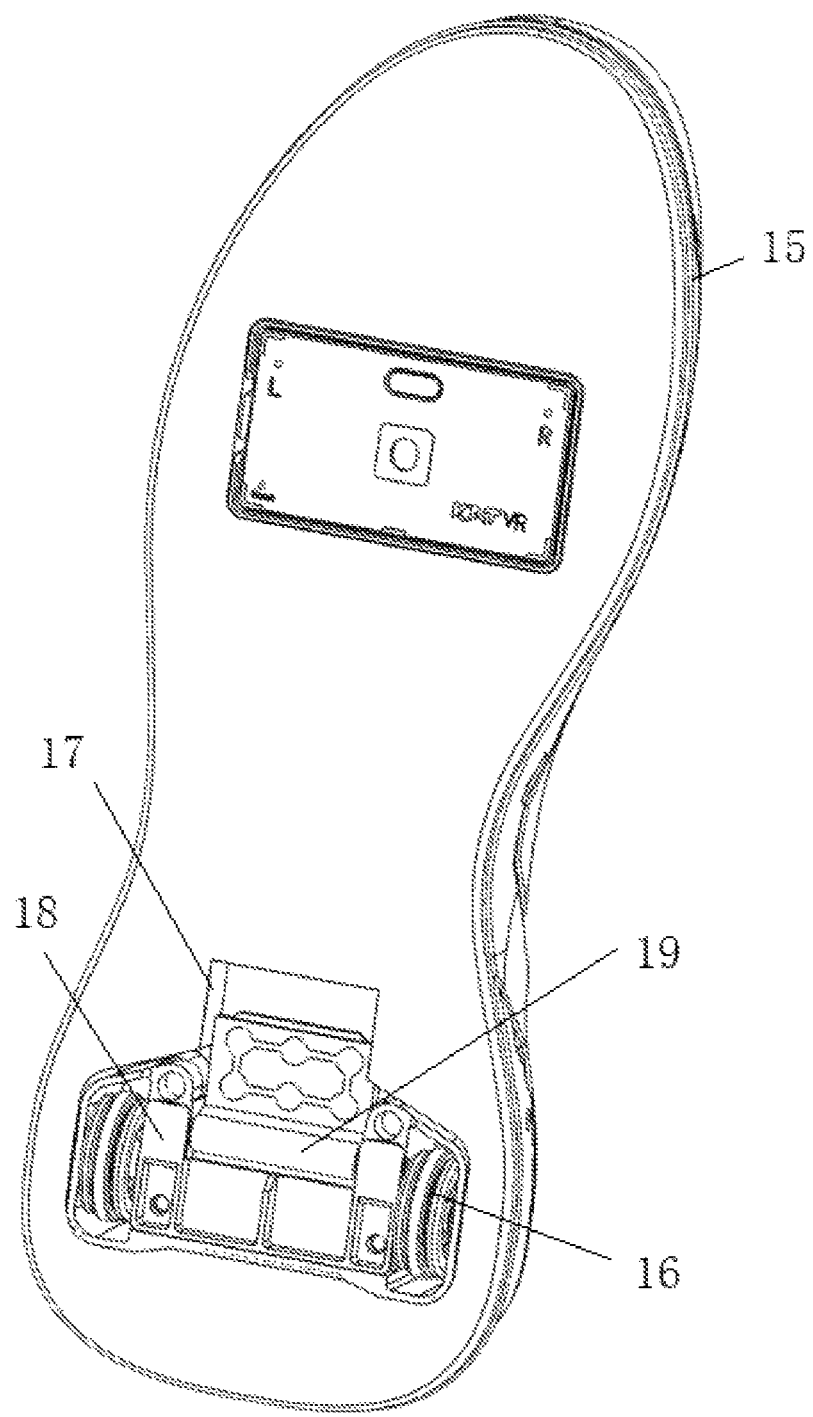
FIG. 4 is a structural schematic diagram of the foot wearable device of the present disclosure where a flipping locking cover is in an open state.

Meanwhile, different from a sliding friction method of conventional foot wearable devices on the running plate, the foot wearable devices of the present disclosure adopts a mixed friction method combining rolling and sliding on the running plate. When the user walks on the running plate, the rollers 16 make the user walk stably and flexibly. The sliding friction of the rollers 16 on the running plate is used as an auxiliary to achieve effect that the foot wearable devices full contact the running plate, which provides a comfortable walking experience. In addition, in the present disclosure, the middle portion of each roller is wrapped with high-strength rubber to achieve effect of buffering and noise reduction. In the present disclosure, each flipping locking cover 19 is integrated in each mounting groove 17. The flipping locking covers 19 are configured to lock the rollers 16. When in use, as shown in FIG. 4, the flipping locking covers 19 are opened. After use, as shown in FIG. 3, the flipping locking covers 19 are closed to lock the rollers 16, so as to achieve a purpose of locking the rollers, achieve safety of the device for visual walking, and improves the aesthetics.

Embodiment 2

The present disclosure further provides a method for virtual walking based on the device for visual walking in Embodiment 1. After the user wars the wrapping bodies, as shown in FIG. 5, human body posture data is obtained by tracking a torso of a human body through the inertial sensor (waist sensor). Specifically, a direction perpendicular to the ground is obtained by the gyroscope in the inertial sensor (the gyroscope measures an earth's magnetic field with the help of a magnetometer to obtain the direction perpendicular to the ground; then, the gyroscope measures the angular acceleration value, and an angular velocity value is obtained by integrating the angular acceleration value in time). The angular velocity value is obtained by integrating the angular acceleration value in time. Then an error function of the attitude angle is iteratively calculated by a gradient descent method; and an error of the attitude angle is continuously corrected until a value of the error of the attitude angle in a current iteration process is within a predetermined range. When integrating the angular acceleration value in time, a whole integration process is divided into multiple segments by reference points appearing periodically. An error of the angular acceleration value in each segment is suppressed by a median filter method.

Since there are two integrations in time, calculation of the attitude angle is not done in a single frame, but in multiple frames, and obtained results drift due to the accumulation of the errors. Therefore, the gradient descent method is adopted to iteratively calculated the error function of the attitude angle and the error of the attitude angle is continuously corrected until the value of the error of the attitude angle in the current iteration process is within the predetermined range. Thus, the calculation of the attitude angle is sensitive and accurate. However, in practice, the gradient descent method still has a problem of convergence rate. That is, if the number of iterations is too many, it is sometimes difficult to ensure a real-time demand, and it is easy to converge to a local minimum instead of a global minimum point. In order to solve the problem, the applicant has made observations and a large number of analysis and research on the application background, and results show that the whole integration process is divided into multiple segments by reference points appearing periodically (When integrating in time, when the inertial sensor suddenly turns, such as when the inertial sensor moves up and down or left and right, position points where a speed thereof is close to zero are found from measurement values of the acceleration sensor of the IMU. After research and analysis, it is found that the corresponding theoretically calculated angle values at these time points are consistent with actual observed values. Since these time points often appear in actual application scenarios of the user, they are used as reference points for dividing the period.) to prevent the propagation and accumulation of errors between different segments. Specifically, the whole integration process is divided into multiple segments instead of one time segment, then an original iteration process is forced to reset many times, which improves convergence, and an error in a certain segment would not be transmitted to a next segment (if only one segment is used, the errors will continue to accumulate due to the integration). Furthermore, as long as a value of the attitude angle at the beginning of each segment is accurate and reliable enough, an average error and an average variance within each segment of the multiple segments are not greater than an average error and an average variance of the one segment when there is only one segment. The selection of segmentation points requires fusion of measurements from displacement and acceleration sensors in the IMU.

In addition, after many experiments, it is found that the error of the angular acceleration value in each segment is suppressed by the median filter method.

Namely, in a sliding window of five elements, a median value is used for filtering, which effectively suppress the error in each segment. Since the operation is a simple operation locally in the window, it is suitable to be implemented on a data processing unit that controls the IMU without occupying other host computer resources.

Then, the earth's magnetic field is measured by the magnetometer to obtain a due north direction and a direction of gravity is obtained by the accelerometer.

The angular velocity value is compared with the direction perpendicular to the ground obtained by the gyroscope, and an orientation of the torso of the human body and an attitude angle of the torso of the human body are measured by performing fusion correction on the north direction and the direction of gravity In the embodiment, the inertial sensor is a waist sensor arranged on the waist of the human body. The waist sensor obtains a rotating direction of the waist in real time.

A calculation formula of the rotating direction of the waist is as follows (with a right-handed coordinate system, and the left-handed rule defines a positive direction):

$$v'=q*vq=q^{-1}vq;$$

v represents the rotating direction of the waist after any vector v rotates clockwise along a rotating axis u defined by an unit vector. q represents a quaternion of the rotating of the waist, that is, the rotating angle.

Meanwhile, the uses puts the left and right feet in the wrapping bodies with the laser sensors to obtain displacement data of the left and right feet, Namely, the displacement data of a left foot and a right foot of the human body is obtained by tracking feet of the human body through the laser sensors.

Specifically, a virtual position of the feet and a movement speed of the feet are respectively obtained according to the displacement data of the left foot and the right foot. Specifically, the virtual position of the feet and the movement speed of the feet are obtained by using the laser sensors to obtain movement position coordinates of the feet and a ground-off state of the feet. The movement speed of the feet and a direction of the feet are calculated based on the movement position coordinates of the feet, the ground-off state of the feet, and a bone reconstruction algorithm.

In the embodiment, a high-performance laser sensor chip is used in each of the laser sensors. Each of the laser sensors is based on laser technology, and continuously collects microscopic surface images (frames) through a lens and an illumination system to determine position changes. Each of the laser sensors comprises an image acquisition system (IAS), a digital signal processor (DSP), and a four-wire serial port. The DSP arranged inside each of the laser sensors is configured to process image to determine the direction and displacement of movement. The DSP is responsible for calculating a relative displacement of X-axis and Y-axis coordinates, and an external microcontroller only needs to read information of the X-axis and Y-axis coordinates through the four-wire serial port. The laser sensors have the ability to detect high-speed motion, a maximum detection speed reaches 150 ips. That is, the laser sensors are able to detect a speed of up to 3.81 m/s, and the acceleration within 30G is not distorted, and the resolution is 8200 cpi (pixels per inch).

Figure 6:
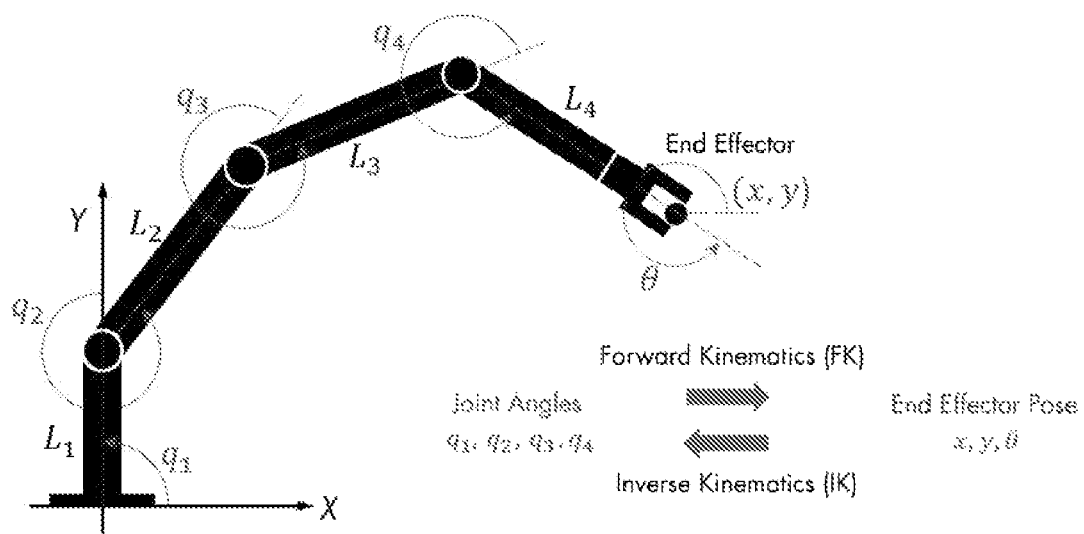
FIG. 6 is a schematic diagram of an IK algorithm of the present disclosure.

A leg posture by the IK algorithm is inferred according to the virtual position of the feet. As shown in FIG. 6, the leg posture is obtained by taking the virtual position of the feet as a last bone point, then a length from the last bone point to an upper bone point and a direction from the last bone point to the upper bone point are calculated by the IK algorithm (The IK algorithm is a mathematical process of calculating a joint parameter of a moving joint end (such as an arm claw of a robotic arm or a palm of an arm end of a character skeleton) relative to starting position and direction of the joint to reach a desired position). A position of an upper joint bone is determined, and a length between each bone point and a rotating angle between each bone point are calculated in turn to obtain the leg posture.

In the method for virtual walking, the steps of controlling the walking action of the virtual character comprises controlling a walking direction of the virtual character according to the human body posture data, controlling a walking speed of the virtual character according to the movement speed of the feet, and controlling a leg movement of the virtual character according to the leg posture.

That is, forward, backward, left, and right leanings of the torso of the human body are used to control forward, backward, left, and right leanings of a torso of the virtual character, and forward, backward, left, and right leanings of the legs of the human body are used to control forward, backward, left translation, and right translation actions of legs of the visual character. The movement speed of the feet of the human body is used to correspondingly control a movement speed of the virtual character.

Embodiment 3

The present disclosure further provides a system for visual walking. The system comprises an inertial sensor, laser sensors, and a computing control platform. The computing control platform is respectively connected with the inertial sensor and the laser sensors. The inertial sensor comprises an acceleration sensor, a gyroscope, a magnetometer, a data processing unit, and a wireless transmission module.

The data processing unit is respectively connected with the acceleration sensor, the gyroscope, the magnetometer, and the wireless transmission module. The gyroscope is configured to obtain the angular velocity value of a torso of a human body. The data processing unit is configured to calculate the integral of the angular velocity value obtained by the gyroscope in time to obtain a current orientation and an attitude angle of the human body. The acceleration sensor and the magnetometer are configured to correct errors of the attitude angle calculated by the data processing unit. The wireless transmission module is configured to transmit the orientation and the attitude angle of the human body to the computing control platform.

The inertial sensor is configured to track the orientation and posture of the human body to obtain orientation and posture data. The laser sensors are configured to track human feet to obtain a virtual position and a movement speed of the feet, and obtain a leg posture by the computing control platform. The computing control platform is configured to control a walking direction of the virtual character according to the human body posture data, control a walking speed of the virtual character according to the movement speed of the feet, and control the leg movement of the virtual character according to the leg posture.

In summary, the present disclosure optimizes a structure of the loading connector of the omnidirectional excise machine, By arranging multiple rows of connecting holes on the one side of the loading frame, mounting the mounting frame between the back support rods, and fixing the mounting frame with the connecting holes, a user is able to install the device for virtual walking according to a height of the user.

Meanwhile, different from a sliding friction method of conventional foot wearable devices on the running plate, the foot wearable devices of the present disclosure adopts a mixed friction method combining rolling and sliding on the running plate. When the user walks on the running plate, the rollers make the user walk stably and flexibly. The sliding friction of the rollers on the running plate is used as an auxiliary to achieve effect that the foot wearable devices full contact the running plate, which provides a comfortable walking experience. In addition, in the present disclosure, the middle portion of each roller is wrapped with high-strength rubber to achieve effect of buffering and noise reduction. In the present disclosure, each flipping locking cover is integrated in each mounting groove. The flipping locking covers are configured to lock the rollers. When in use, the flipping locking covers are opened. After use, the flipping locking covers are closed to lock the rollers, so as to achieve a purpose of locking the rollers, achieve safety of the device for visual walking, and improves the aesthetics.

In the method for visual walking of the present disclosure, the human body posture data is obtained by tracking the torso of the human body, the displacement data of the left foot and the right foot is obtained by tracking the feet of the human body through the laser sensors, the virtual position of the feet and the movement speed of the feet are respectively obtained according to the displacement data of the left foot and the right foot, the leg posture is inferred by the IK algorithm according to the virtual position of the feet, and the walking action of the virtual character is controlled according to the human body posture data, the movement speed of the feet, and the leg posture. The method for visual walking of the present disclosure overcomes a difference between visual perception and physical perception, and does not bring a strong sense of dizziness to the user. Moreover, in the present disclosure, the user is able to obtain the displacement data of the left foot and the right foot in real time through the laser sensors, and then combine it with virtual reality. Compared with the conventional virtual reality technology, the present disclosure brings a better feeling to the user, has a better sense of fit and immersion.

What is claimed is:

1. A device for virtual walking, comprising: an omnidirectional exercise machine and foot wearable devices;
    wherein the omnidirectional exercise machine comprises a base, a support piece arranged on the base through a bearing, and a running plate arranged on the support piece; one side of the bearing is connected with two back support rods through rotating beams; a loading connector is arranged on upper ends of the two back support rods; the loading connector is sequentially connected with a waist omnidirectional motion controller and a binding belt; the base, the support piece, and the running plate are coaxially arranged; an inertial sensor is arranged inside the waist omnidirectional motion controller; the loading connector comprises a loading frame; rows of connecting holes are on one side of the loading frame; a mounting frame arranged between the two back support rods; the mounting frame is fixedly connected with at least one row of connecting holes through connecting pieces;
    wherein the foot wearable devices are configured to move on the running plate; each of the foot wearable devices comprises a wrapping body; a pair of rollers are arranged on a rear end of a bottom portion of each wrapping body; a laser sensor is arranged on a front end of the bottom portion of each wrapping body.

2. The device for virtual walking according to claim 1, wherein a middle portion of each roller is wrapped with rubber.

3. The device for virtual walking according to claim 1, wherein a mounting groove is provided on the bottom portion of each wrapping body; two mounting bars are separately arranged on two sides of each mounting groove; an outer side of each of the mounting bar is connected with a corresponding roller.

4. The device for virtual walking according to claim 3, wherein a flipping locking cover is arranged between each two mounting bars; each flipping locking cover is configured to lock a corresponding pair of rollers.

5. A method for virtual walking of the device for visual walking according to claim 1, comprising steps:
    obtaining human body posture data; wherein the human body posture data is obtained by tracking a torso of a human body through the inertial sensor;
    obtaining displacement data of a left foot and a right foot of the human body; wherein the displacement data of the left foot and the right foot is obtained by tracking feet of the human body through the laser sensors;
    respectively obtaining a virtual position of the feet and a movement speed of the feet according to the displacement data of the left foot and the right foot;
    inferring a leg posture by an inverse kinematic (IK) algorithm according to the virtual position of the feet; and controlling walking action of a virtual character according to the human body posture data, the movement speed of the feet, and the leg posture.

6. The method for virtual walking according to claim 5, wherein the step of obtaining the human body posture data comprises:
   obtaining a direction perpendicular to the ground by a gyroscope arranged in the inertial sensor;
   measuring an angular acceleration value by the gyroscope; obtaining an angular velocity value by integrating the angular acceleration value in time;
   measuring an earth's magnetic field by a magnetometer to obtain a due north direction; obtaining a direction of gravity by an accelerometer;
   comparing the angular velocity value with the direction perpendicular to the ground obtained by the gyroscope; and measuring an orientation of the torso of the human body and an attitude angle of the torso of the human body by performing fusion correction on the due north direction and the direction of gravity;
   iteratively calculating an error function of the attitude angle by a gradient descent method; continuously correcting an error of the attitude angle until an value of the error of the attitude angle in a current iteration process is within a predetermined range; and
   dividing a whole integration process into multiple segments by reference points appearing periodically when integrating the angular acceleration value in time; suppressing an error of the angular acceleration value in each segment by a median filter method.

7. The method for virtual walking according to claim 5, wherein the virtual position of the feet and the movement speed of the feet are obtained by using the laser sensors to obtain movement position coordinates of the feet and a ground-off state of the feet; the movement speed of the feet and a directions of the feet are calculated based on the movement position coordinates of the feet, the ground-off state of the feet, and a bone reconstruction algorithm.

8. The method for virtual walking according to claim 5, wherein the leg posture is obtained by taking the virtual position of the feet as a last bone point, calculating a length from the last bone point to an upper bone point and a direction from the last bone point to the upper bone point by the IK algorithm, determining a position of an upper joint bone, and calculating a length between each bone point and a rotating angle between each bone point in turn to obtain the leg posture.

9. The method for virtual walking according to claim 5, wherein the steps of controlling the walking action of the virtual character comprises controlling a walking direction of the virtual character according to the human body posture data, controlling a walking speed of the virtual character according to the movement speed of the feet, and controlling a leg movement of the virtual character according to the leg posture.

* * * * *